United States Patent
Han et al.

(10) Patent No.: US 12,455,219 B2
(45) Date of Patent: Oct. 28, 2025

(54) DROP TEST DEVICE FOR CASE OF VEHICLE BATTERY PACK

(71) Applicant: Hangzhou Vocational & Technical College, Hangzhou (CN)

(72) Inventors: Tianlong Han, Hangzhou (CN); Yangqing Li, Hangzhou (CN)

(73) Assignee: Hangzhou Vocational & Technical College, Hangzhou (CN)

( * ) Notice: Subject to any disclaimer, the term of this patent is extended or adjusted under 35 U.S.C. 154(b) by 396 days.

(21) Appl. No.: 18/194,488

(22) Filed: Mar. 31, 2023

(65) Prior Publication Data
US 2024/0328915 A1    Oct. 3, 2024

(51) Int. Cl.
*G01N 3/303*    (2006.01)
(52) U.S. Cl.
CPC .................................. *G01N 3/303* (2013.01)
(58) Field of Classification Search
CPC .............................. G01N 3/30; G01N 3/303
See application file for complete search history.

(56) References Cited

U.S. PATENT DOCUMENTS

| | | | | |
|---|---|---|---|---|
| 10,107,730 B2 * | 10/2018 | Bajaj | ...................... | G01N 3/303 |
| 2009/0031783 A1 * | 2/2009 | Fukushima | ............ | G01N 3/303 |
| | | | | 73/12.06 |

FOREIGN PATENT DOCUMENTS

| | | |
|---|---|---|
| CN | 208937436 U | 6/2019 |
| CN | 110231136 A | 9/2019 |
| CN | 214893948 U | 11/2021 |

* cited by examiner

*Primary Examiner* — Erika J. Villaluna
(74) *Attorney, Agent, or Firm* — Nitin Kaushik

(57) ABSTRACT

The invention discloses a drop test device for a case of a vehicle battery pack. The device includes a bracket body, and a mounting frame is suspended horizontally on an upper end surface of the bracket body. The two mounting frames are fixed parallel to the bracket body, and a fixing frame is horizontally fixed below each of the mounting frames on the bracket body. A sliding seat is slidably arranged between the two mounting frames, and one side of the fixing frame is provided with a side connecting plate. A sliding rail is arranged between the sliding seat and the side connecting plate, and a simulated platform mechanism is slidably arranged on the sliding rail for body installation of the vehicle battery pack so as to design installation states of the vehicle battery pack according to different models.

8 Claims, 4 Drawing Sheets

DROP TEST DEVICE FOR CASE OF VEHICLE BATTERY PACK

FIELD OF THE INVENTION

The invention relates to the technical field of test equipment for vehicle battery performance, in particular, to a drop test device for a case of a vehicle battery pack.

BACKGROUND OF THE INVENTION

With the large-scale popularization of electric vehicles and the continuous increase of market demand, as an important part of electric vehicles, the quality and safety of vehicle batteries have become more and more critical. The impact resistance and durability of the case of the vehicle battery pack is one of the important factors affecting the performance and life of the battery, so as to ensure the safety of the battery in actual use. In the prior art, the drop test for the case of the vehicle battery is mainly conducted by dropping the battery freely from a certain height onto a hard surface and observing whether the case of the battery is cracked or deformed to evaluate the reliability and safety in daily use; however, the test has high limitations, and the landing ground and the drop angle in the test cannot fully simulate the actual road conditions, so the test results are not representative.

Therefore, those skilled in the art provides a drop test device for a case of a vehicle battery pack, so as to solve the problems proposed in the background.

BRIEF SUMMARY OF THE DISCLOSURE

In order to achieve the above objective, the invention provides the following technical solutions: a drop test device for a case of a vehicle battery pack includes a bracket body, and a mounting frame is suspended horizontally on an upper end surface of the bracket body; the two mounting frames are fixed parallel to the bracket body, and a fixing frame is horizontally fixed below each of the mounting frames on the bracket body; a sliding seat is slidably arranged between the two mounting frames, and one side of the fixing frame is provided with a side connecting plate; a sliding rail is arranged between the sliding seat and the side connecting plate, and a simulated platform mechanism is slidably arranged on the sliding rail for body installation of the vehicle battery pack so as to design installation states of the vehicle battery pack according to different models; a variable speed adjustment assembly is embedded and fixed in the sliding rail, a plurality of the variable speed adjustment assemblies are arranged in a sliding rail and are in magnetic contact with the simulated platform mechanism, and the mounting frame is further provided with a hook device.

Further, preferably, a middle portion of a lower end surface of the sliding seat is fixed with a rotating shaft seat; an upper end of the sliding rail is arranged in the rotating shaft seat by way of universal rotation through a rotating shaft, and an inner portion of a lower end surface of the sliding rail is slidably provided with a connecting frame, and an adjustment seat is horizontally slidably arranged on the side connecting plate; one end of the connecting frame is connected on the adjustment seat by way of universal rotation, a hydraulic telescopic rod is horizontally fixed on the mounting frame, and one end of the hydraulic telescopic rod is connected with the sliding seat.

Further, preferably, the simulated platform mechanism includes a pulley set, which is slidably mounted on the sliding rail; one side of the pulley set is rotatably provided with a loading frame, and one side of the a loading frame is mounted with a split through a bolt rod; the pulley set is further rotatably connected with a telescopic adjustment rod, and one end of the telescopic adjustment rod is connected with the loading frame.

Further, preferably, the variable speed adjustment assembly includes an inner frame plate, which is slidably arranged in the sliding rail; an electromagnetic adsorption seat is vertically slidably arranged on the inner frame plate, and a support spring is connected between the electromagnetic adsorption seat and the inner frame plate; a base is mounted on the simulated platform mechanism, an end surface of the base is arranged parallel to a surface of the sliding rail, and a magnetic plate is fixed on the base; the magnetic plate and the electromagnetic adsorption seat are attracted with each other with opposite magnetism, the sliding rail is further provided inside with a plurality of support adjustment devices, and one end of each of the support adjustment devices is connected with the inner frame plate.

Further, preferably, the support adjustment device includes an outer cylinder body, which is slidably provided inside with a piston; an upper part of the piston inside the outer cylinder body is sealed and slidably provided with a plunger rod, and one end of the plunger rod is connected with the inner frame plate; a sealed inner cavity is formed between the piston and the plunger rod, and a plurality of limit springs are connected inside the sealed inner cavity; a lower end surface of the outer cylinder body is connected with an air pressure pipe, and one end of the air pressure pipe is communicated with an external air pump.

Further, preferably, the air pressure pipe is further provided with an airflow valve.

Further, preferably, the outer cylinder body is tightly sleeved with a pipe sleeve, a ring plug is slidably arranged in the pipe sleeve, and a plurality of connecting pipes are connected on the plunger rod; the connecting pipe has one side communicated with the sealed inner cavity, and the other side connected with the pipe sleeve; an lower part of the ring plug inside the pipe sleeve is connected with a plurality of inner springs.

Further, preferably, a striking member is arranged on the adjustment seat.

Compared with the prior art, the invention has the following beneficial effects:

In the invention, the sliding rail provided may be provided at multiple angles so that the case of the vehicle battery pack on the simulated platform mechanism may be dropped at multiple angles along the sliding rail to record the drop conditions of the battery at different heights and angles (speed, angle, impact force, etc.), thereby evaluating the safety performance and durability performance and providing important data support for the improvement in the safety performance of the vehicle battery; the variable speed adjustment assembly further provided may assist in adjusting the impact speed when the case of the vehicle battery pack slides and drops, improving the extensiveness of the test, so as to simulate the state of the vehicle battery when the vehicle travels.

In figures: 1. Bracket body; 11. Mounting frame; 12. Fixing frame; 13. Sliding seat; 14. Side connecting plate; 15. Hook device; 16. Rotating shaft seat; 17. Hydraulic telescopic rod; 2. Sliding rail; 3. Simulated platform mechanism; 31. Pulley set; 32. Loading frame; 33. Splint; 34. Bolt rod; 35. Telescopic adjustment rod; 4. Variable speed adjustment assembly; 41. Inner frame plate; 42. Electromagnetic adsorption seat; 43. Support spring; 44. Base; 45. Magnetic plate; 5. Support adjustment device; 51. Outer cylinder body; 52. Piston; 53. Plunger rod; 54. Air pressure pipe; 55. Pipe sleeve; 56. Ring plug; 57. Inner spring; 58. Connecting pipe.

DETAILED DESCRIPTION OF THE INVENTION

Figure 1:
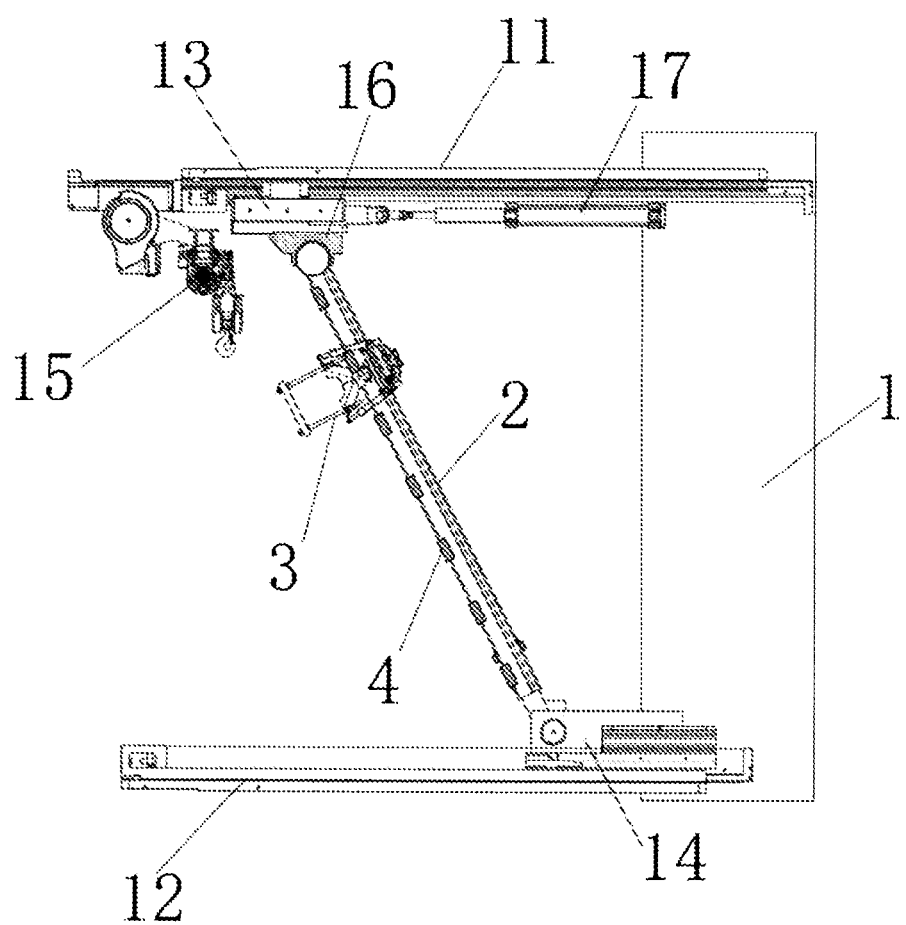
FIG. 1 is a schematic structural diagram of the invention.
Figure 2:
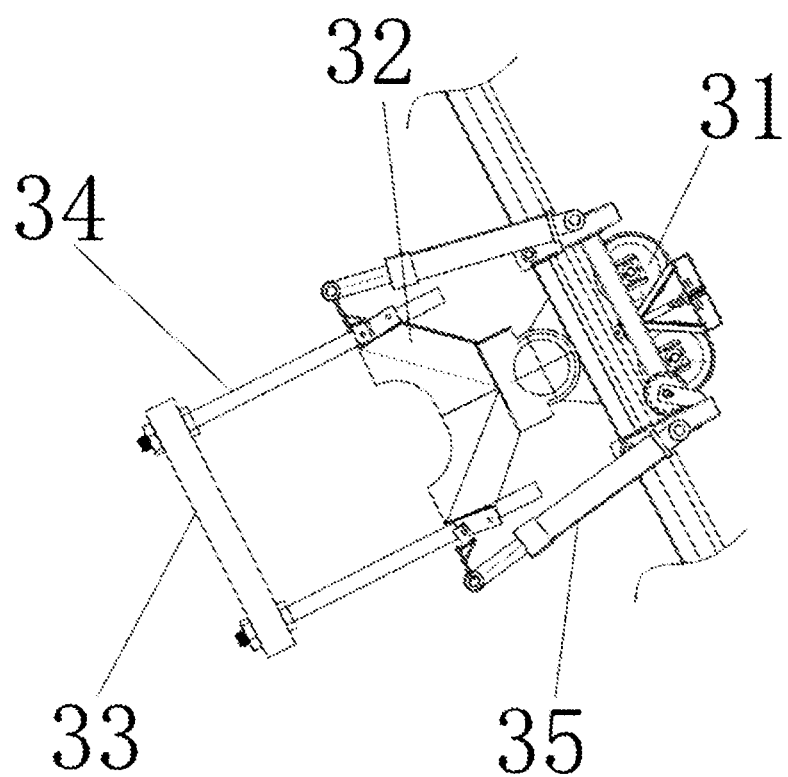
FIG. 2 is a schematic structural diagram of a simulated platform mechanism of the invention.
Figure 3:
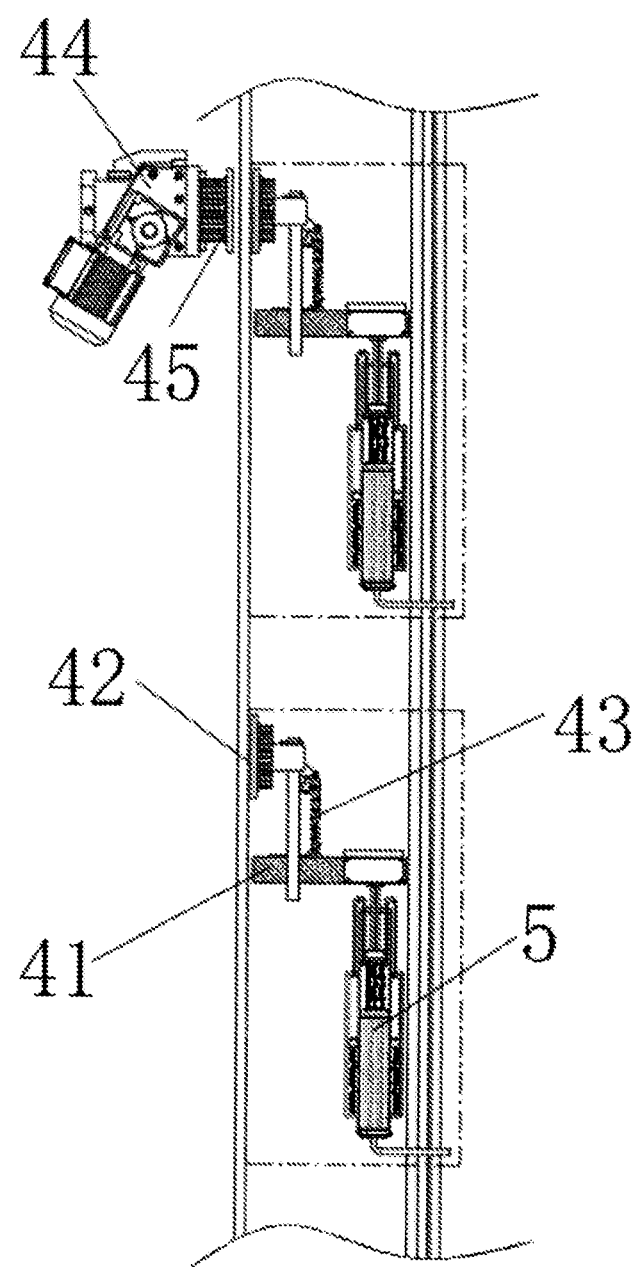
FIG. 3 is a schematic structural diagram of a variable speed adjustment assembly of the invention.
Figure 4:
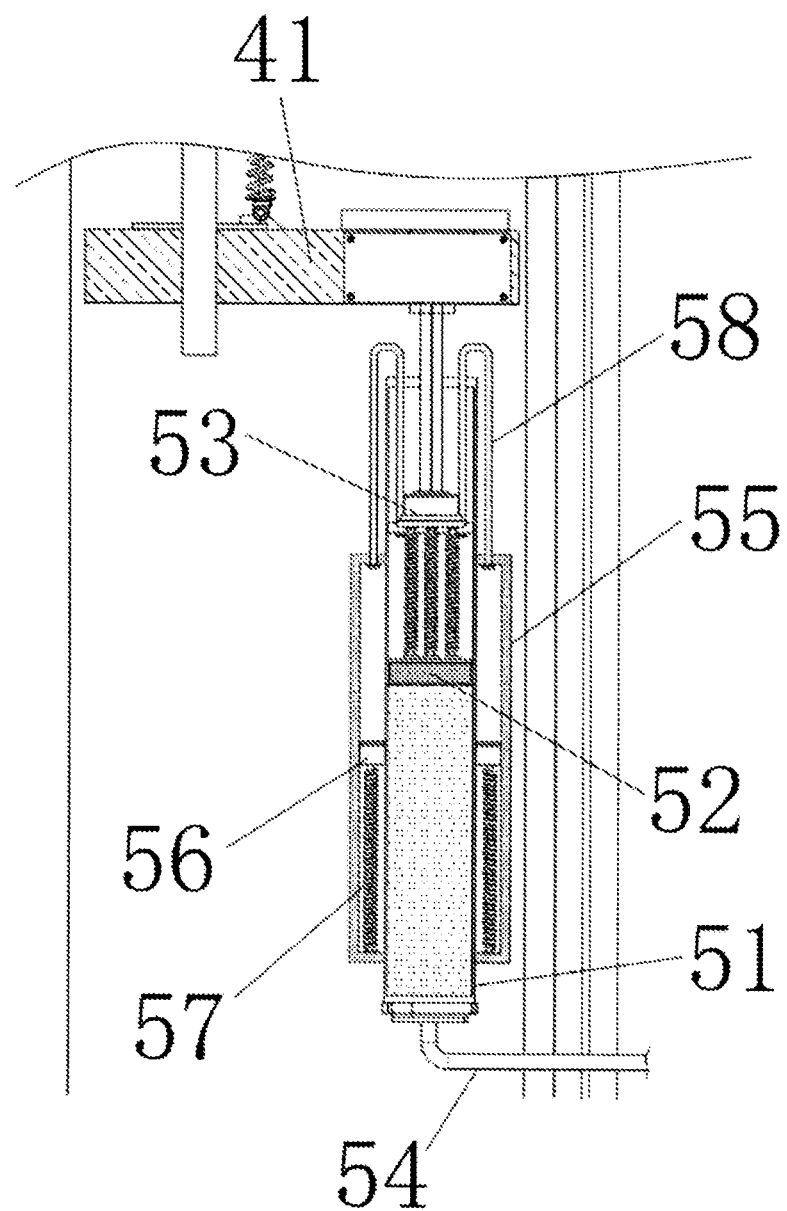
FIG. 4 is a schematic structural diagram of a support adjustment device of the invention.

With reference to FIG. 1, in an embodiment of the invention, a drop test device for a case of a vehicle battery pack includes a bracket body 1, wherein a mounting frame 11 is suspended horizontally on an upper end surface of the bracket body; the two mounting frames 11 are fixed parallel to the bracket body 1, and a fixing frame 12 is horizontally fixed below each of the mounting frames 11 on the bracket body 1; a sliding seat 13 is slidably arranged between the two mounting frames 11, and one side of the fixing frame 12 is provided with a side connecting plate 14; a sliding rail 2 is arranged between the sliding seat 13 and the side connecting plate 14, and a simulated platform mechanism 3 is slidably arranged on the sliding rail 2 for body installation of the vehicle battery pack so as to design installation states of the vehicle battery pack according to different models; a variable speed adjustment assembly 4 is embedded and fixed in the sliding rail 2, a plurality of the variable speed adjustment assemblies 4 are arranged in a sliding rail 2 and are in magnetic contact with the simulated platform mechanism 3, and the mounting frame 11 is further provided with a hook device 15. The hook device may lift the simulated platform mechanism, so that the case of the vehicle battery pack may be lifted at different heights, wherein it should be noted that the drop conditions of the case of the vehicle battery pack at different heights and angles are recorded, including the speed, angle, impact force, and contact surface size of the drop, etc., so that the safety performance and the durability performance are evaluated through the impact drop test of the case of the vehicle battery pack, thereby providing important technical support for the improvement in the safety performance and research and development of the vehicle battery.

In the embodiment, a middle portion of a lower end surface of the sliding seat 13 is fixed with a rotating shaft seat 16; an upper end of the sliding rail 2 is arranged in the rotating shaft seat 16 by way of universal rotation through a rotating shaft, and an inner portion of a lower end surface of the sliding rail 2 is slidably provided with a connecting frame, and an adjustment seat is horizontally slidably arranged on the side connecting plate 14; one end of the connecting frame is connected on the adjustment seat by way of universal rotation, a hydraulic telescopic rod 17 is horizontally fixed on the mounting frame 11, and one end of the hydraulic telescopic rod 17 is connected with the sliding seat 13. In other words, the hydraulic telescopic rod may realize the lateral displacement of the sliding seat under the telescopic adjustment, and in cooperate with the displacement adjustment of the adjustment seat (sliding along the side connecting plate), so as to realize the multi-angle erection in the space of the sliding rail.

As a preferred embodiment, the simulated platform mechanism 3 includes a pulley set 31, which is slidably mounted on the sliding rail 2; one side of the pulley set 31 is rotatably provided with a loading frame 32, and one side of the a loading frame 32 is mounted with a split 33 through a bolt rod 34; the pulley set 31 is further rotatably connected with a telescopic adjustment rod 35, and one end of the telescopic adjustment rod 35 is connected with the loading frame 32. The loading frame is deflected accordingly through the telescopic drive of the telescopic adjustment rod, so that the case of the vehicle battery pack on the loading frame may adjust the arrangement state, thereby simulating the installation method of the case of the vehicle battery pack in reality, wherein the loading frame may be designed according to different models.

In the embodiment, the variable speed adjustment assembly 4 includes an inner frame plate 41, which is slidably arranged in the sliding rail 2; an electromagnetic adsorption seat 42 is vertically slidably arranged on the inner frame plate 41, and a support spring 43 is connected between the electromagnetic adsorption seat 42 and the inner frame plate 41; a base 44 is mounted on the simulated platform mechanism 3, an end surface of the base 44 is arranged parallel to a surface of the sliding rail 2, and a magnetic plate 45 is fixed on the base 44; the magnetic plate 4 and the electromagnetic adsorption seat 42 are attracted with each other with opposite magnetism, the sliding rail 2 is further provided inside with a plurality of support adjustment devices 5, and one end of each of the support adjustment devices 5 is connected with the inner frame plate 41. In other words, the simulated platform mechanism may realize deceleration adjustment through the attraction with opposite magnetism between the magnetic plate and the electromagnetic adsorption seat by the plurality of variable speed adjustment assemblies in the drop test, wherein the plurality of electromagnetic adsorption seats may be in working and energized or non-working states, with high flexibility in adjustment, simulating a variety of use states for the vehicle.

In the embodiment, the support adjustment device 5 includes an outer cylinder body 51, which is slidably provided inside with a piston 52; an upper part of the piston 52 inside the outer cylinder body 51 is further sealed and slidably provided with a plunger rod 53, and one end of the plunger rod 53 is connected with the inner frame plate 41; a sealed inner cavity is formed between the piston 52 and the plunger rod 53, and a plurality of limit springs are connected inside the sealed inner cavity; a lower end surface of the outer cylinder body 51 is connected with an air pressure pipe 54, and one end of the air pressure pipe 54 is communicated with an external air pump (not shown). The air pressure pipe may supply air to pressurize the piston and the plunger rod to slide synchronously, so as to realize the fine adjustment of the distance between adjacent inner frame plates.

In the embodiment, the air pressure pipe 54 is further provided with an airflow valve for controlling the air pressure pipe to pump and exhaust the air.

As a preferred embodiment, the outer cylinder body 51 is tightly sleeved with a pipe sleeve 55, a ring plug 56 is slidably arranged in the pipe sleeve 55, and a plurality of connecting pipes 58 are connected on the plunger rod 53; the connecting pipe 58 has one side communicated with the sealed inner cavity, and the other side connected with the pipe sleeve 55; an lower part of the ring plug 56 inside the pipe sleeve 55 is connected with a plurality of inner springs 57. In particular, when the case of the vehicle battery pack passes through the variable speed adjustment assembly, the magnetic plate and the corresponding electromagnetic adsorption seat are attracted to each other with opposite magnetism to gradually compress the support spring during the displacement while the inner frame plate sliding, and the airflow in the scaled inner cavity is compressed into the pipe sleeve to drive the ring plug to slide axially (an exhaust hole is provided under the pipe sleeve), so as to ensure the sufficient mutual attraction between the magnetic plate and the electromagnetic adsorption seat for realizing the deceleration adjustment of the simulated platform mechanism, wherein the opening and closing of the airflow valve may be controlled to adjust the distance of the suction effect between each of the variable speed adjustment assembly and the simulated platform mechanism.

In the embodiment, a striking member is arranged on the adjustment seat, thereby changing the impact contact surface.

Specifically, the case of the vehicle battery pack is mounted on the simulated platform mechanism, and the hook device may lift the simulated platform mechanism to facilitate the case of the vehicle battery pack to suspend at different heights while the sliding rail may be erected vertically or inclined at multiple angles in the space; during the test, the simulated platform mechanism slides freely along the sliding rail to record the drop conditions of the case of the vehicle battery pack at different heights and angles (speed, angle, impact force, etc.), and the variable speed adjustment assembly may assist in adjusting the impact speed when the case of the vehicle battery pack slides and drops, improving the extensiveness of the test, so as to evaluate the safety performance and the durability performance.

What has been described above is only a preferred embodiment of the invention, but the protection scope of the invention is not limited thereto. Any equivalent replacements or changes made by those skilled in the art within the technical scope disclosed in the invention according to the technical solution of the invention and the inventive concepts shall fall within the protection scope of the invention.

What is claimed is:

1. A drop test device for a case of a vehicle battery pack, comprising a bracket body (1), wherein a mounting frame (11) is suspended horizontally on an upper end surface of the bracket body; two mounting frames (11) are fixed parallel to the bracket body (1), and a fixing frame (12) is horizontally fixed below each of the mounting frames (11) on the bracket body (1); a sliding seat (13) is slidably arranged between the two mounting frames (11), and one side of the fixing frame (12) is provided with a side connecting plate (14); a sliding rail (2) is arranged between the sliding seat (13) and the side connecting plate (14), and a simulated platform mechanism (3) is slidably arranged on the sliding rail (2) for body installation of the vehicle battery pack so as to design installation states of the vehicle battery pack according to different models; a variable speed adjustment assembly (4) is embedded and fixed in the sliding rail (2), a plurality of the variable speed adjustment assemblies (4) are arranged in a sliding rail (2) and are in magnetic contact with the simulated platform mechanism (3), and the mounting frame (11) is further provided with a hook device (15).

2. The drop test device for a case of a vehicle battery pack according to claim 1, wherein a middle portion of a lower end surface of the sliding seat (13) is fixed with a rotating shaft seat (16); an upper end of the sliding rail (2) is arranged in the rotating shaft seat (16) by way of universal rotation through a rotating shaft, and an inner portion of a lower end surface of the sliding rail (2) is slidably provided with a connecting frame, and an adjustment seat is horizontally slidably arranged on the side connecting plate (14); one end of the connecting frame is connected on the adjustment seat by way of universal rotation, a hydraulic telescopic rod (17) is horizontally fixed on the mounting frame (11), and one end of the hydraulic telescopic rod (17) is connected with the sliding seat (13).

3. The drop test device for a case of a vehicle battery pack according to claim 2, wherein a striking member is arranged on the adjustment seat.

4. The drop test device for a case of a vehicle battery pack according to claim 1, wherein the simulated platform mechanism (3) comprises a pulley set (31), which is slidably mounted on the sliding rail (2); one side of the pulley set (31) is rotatably provided with a loading frame (32), and one side of the a loading frame (32) is mounted with a split (33) through a bolt rod (34); the pulley set (31) is further rotatably connected with a telescopic adjustment rod (35), and one end of the telescopic adjustment rod (35) is connected with the loading frame (32).

5. The drop test device for a case of a vehicle battery pack according to claim 1, wherein the variable speed adjustment assembly (4) comprises an inner frame plate (41), which is slidably arranged in the sliding rail (2); an electromagnetic adsorption seat (42) is vertically slidably arranged on the inner frame plate (41), and a support spring (43) is connected between the electromagnetic adsorption seat (42) and the inner frame plate (41); a base (44) is mounted on the simulated platform mechanism (3), an end surface of the base (44) is arranged parallel to a surface of the sliding rail (2), and a magnetic plate (45) is fixed on the base (44); the magnetic plate (4) and the electromagnetic adsorption seat (42) are attracted with each other with opposite magnetism, the sliding rail (2) is further provided inside with a plurality of support adjustment devices (5), and one end of each of the support adjustment devices (5) is connected with the inner frame plate (41).

6. The drop test device for a case of a vehicle battery pack according to claim 5, wherein the support adjustment device (5) comprises an outer cylinder body (51), which is slidably provided inside with a piston (52); an upper part of the piston (52) inside the outer cylinder body (51) is sealed and slidably provided with a plunger rod (53), and one end of the plunger rod (53) is connected with the inner frame plate (41); a scaled inner cavity is formed between the piston (52) and the plunger rod (53), and a plurality of limit springs are connected inside the sealed inner cavity; a lower end surface of the outer cylinder body (51) is connected with an air pressure pipe (54), and one end of the air pressure pipe (54) is communicated with an external air pump.

7. The drop test device for a case of a vehicle battery pack according to claim 4, wherein the air pressure pipe (54) is further provided with an airflow valve.

8. The drop test device for a case of a vehicle battery pack according to claim 4, wherein the outer cylinder body (51) is tightly sleeved with a pipe sleeve (55), a ring plug (56) is slidably arranged in the pipe sleeve (55), and a plurality of connecting pipes (58) are connected on the plunger rod (53); the connecting pipe (58) has one side communicated with the sealed inner cavity, and the other side connected with the pipe sleeve (55); an lower part of the ring plug (56) inside the pipe sleeve (55) is connected with a plurality of inner springs (57).

\* \* \* \* \*